United States Patent
Lundgreen et al.

(10) Patent No.: US 11,940,178 B2
(45) Date of Patent: Mar. 26, 2024

(54) CONDENSING, ULTRA-LOW NOX GAS-FIRED HUMIDIFIER

(71) Applicant: DRI-STEEM Corporation, Eden Prairie, MN (US)

(72) Inventors: James M. Lundgreen, Lakeville, MN (US); Cole K. Farley, Long Lake, MN (US); Alvin J. Klisch, Eden Prairie, MN (US); David Pflum, Eden Prairie, MN (US); Daniel W. Celotta, Circle Pines, MN (US)

(73) Assignee: DRI-STEEM Corporation, Eden Prairie, MN (US)

( * ) Notice: Subject to any disclaimer, the term of this patent is extended or adjusted under 35 U.S.C. 154(b) by 0 days.

(21) Appl. No.: 17/855,156

(22) Filed: Jun. 30, 2022

(65) Prior Publication Data

US 2022/0404041 A1 Dec. 22, 2022

Related U.S. Application Data

(63) Continuation of application No. 16/251,938, filed on Jan. 18, 2019, now Pat. No. 11,421,899.
(Continued)

(51) Int. Cl.
*F24F 6/18* (2006.01)
*F22B 9/00* (2006.01)
(Continued)

(52) U.S. Cl.
CPC ............. *F24F 6/18* (2013.01); *F22B 9/00* (2013.01); *F22B 31/08* (2013.01); *F22B 37/06* (2013.01);
(Continued)

(58) Field of Classification Search
CPC .... F24F 6/18; F24F 2006/008; F24F 2221/34; F22B 9/00; F22B 31/08; F22B 37/06; F23C 2900/09002; F23D 14/22; Y02E 20/34

See application file for complete search history.

(56) References Cited

U.S. PATENT DOCUMENTS 675,981 A * 6/1901 Seifert .................... F24C 3/002
                                                     126/117
2,059,408 A * 11/1936 Stark ......................... F24F 6/12
                                                     261/153
(Continued)

FOREIGN PATENT DOCUMENTS

CA        2967262 A     12/2017
CN     101029758 A     9/2007
(Continued)

OTHER PUBLICATIONS

"Orifice plate" Wikipedia published Nov. 6, 2016 accessed at <https://en.wikipedia.org/w/index.php?title=Orifice_plate&oldid=748052850> (Year: 2016).*
(Continued)

*Primary Examiner* — Stephen Hobson
(74) *Attorney, Agent, or Firm* — Merchant & Gould P.C.

(57) ABSTRACT

A gas-fired atmospheric pressure steam humidifier having high efficiency and ultra-low NOx(3) emissions is disclosed. In some examples, the gas-fired humidifier can have an efficiency of greater than 90 percent and a NOx(3) output of less than 20 parts per million (ppm). In one aspect, the humidifier includes a secondary heat exchanger having a first heat exchange section for pre-heating combustion air and a separate second heat exchange section for pre-heating make-up water, wherein the first and second heat exchange sections are in heat transfer communication with exhaust gases generated by the gas-fired burner and combustion
(Continued)

blower assembly. In some examples, the first heat exchange section includes orifices for enabling flue gas recirculation.

7 Claims, 8 Drawing Sheets

Related U.S. Application Data

(60) Provisional application No. 62/619,701, filed on Jan. 19, 2018.

(51) Int. Cl.
*F22B 31/08* (2006.01)
*F22B 37/06* (2006.01)
*F22D 1/00* (2006.01)
*F23D 14/22* (2006.01)
*F24F 6/00* (2006.01)

(52) U.S. Cl.
CPC ...... *F22D 1/00* (2013.01); *F23C 2900/09002* (2013.01); *F23D 14/22* (2013.01); *F24F 2006/008* (2013.01); *F24F 2221/34* (2013.01)

(56) References Cited

U.S. PATENT DOCUMENTS

| | | | |
|---|---|---|---|
| 2,328,538 A | 9/1943 | Furlong | |
| 2,361,643 A * | 10/1944 | Mueller | F24D 5/00 122/DIG. 1 |
| 2,555,528 A | 6/1951 | Angelery | |
| 3,204,629 A * | 9/1965 | Newton, Jr. | F24H 1/107 122/448.1 |
| 3,213,831 A * | 10/1965 | Hochmuth | F22B 21/345 122/1 R |
| 3,801,077 A | 4/1974 | Pearson | |
| 3,913,330 A * | 10/1975 | Horlitz, Jr. | F01K 15/04 122/DIG. 2 |
| 3,927,627 A * | 12/1975 | Brunn | F23L 15/00 431/115 |
| 4,034,571 A | 7/1977 | Bollinger | |
| 4,054,122 A * | 10/1977 | Reed | F24H 9/0052 392/402 |
| 4,146,775 A | 3/1979 | Kirchner et al. | |
| 4,256,081 A * | 3/1981 | Stover | F24B 7/00 126/110 R |
| 4,257,389 A * | 3/1981 | Texidor | F24F 3/14 261/DIG. 46 |
| 4,285,302 A | 8/1981 | Kelly | |
| 4,294,223 A * | 10/1981 | Montague | F23L 11/02 126/293 |
| 4,360,368 A | 11/1982 | Lyon | |
| 4,382,173 A | 5/1983 | Howard-Liecester | |
| 4,766,921 A * | 8/1988 | Williams | G05D 7/0635 251/129.08 |
| 4,932,464 A * | 6/1990 | Lee | F23L 15/00 122/DIG. 2 |
| 5,057,010 A * | 10/1991 | Tsai | F27D 17/004 431/11 |
| 5,161,488 A | 11/1992 | Natter | |
| 5,247,907 A * | 9/1993 | Lee | C10G 9/20 122/1 R |
| 5,292,904 A * | 3/1994 | Sawada | C07D 301/10 549/534 |
| 5,349,946 A | 9/1994 | McComb | |
| 5,435,151 A | 7/1995 | Han | |
| 5,816,496 A * | 10/1998 | Kovacs | F22B 13/005 126/350.2 |
| 6,058,718 A | 5/2000 | Forsberg et al. | |
| 6,182,453 B1 | 2/2001 | Forsberg | |
| 6,370,878 B1 | 4/2002 | Dean et al. | |
| 6,397,788 B2 * | 6/2002 | Besik | F22B 13/023 122/491 |
| 6,508,208 B1 | 1/2003 | Frasure et al. | |
| 6,619,041 B2 * | 9/2003 | Marin | F22B 31/00 60/653 |
| 6,684,648 B2 | 2/2004 | Abdul-Rahman | |
| 6,705,535 B1 | 3/2004 | Morton | |
| 6,755,037 B2 | 6/2004 | Engel et al. | |
| 6,997,004 B1 | 2/2006 | Pittman | |
| 7,066,396 B2 * | 6/2006 | Knight | F22D 1/36 237/19 |
| 7,281,498 B2 * | 10/2007 | Besik | F22B 13/023 122/491 |
| 7,623,711 B2 | 11/2009 | Berkner | |
| 7,623,771 B2 | 11/2009 | Lentz et al. | |
| 7,826,725 B2 | 11/2010 | Wolff et al. | |
| 7,832,364 B2 * | 11/2010 | Liu | C01B 3/382 122/18.1 |
| 7,913,433 B2 | 3/2011 | Jiang et al. | |
| 9,091,497 B2 | 7/2015 | Schwendinger et al. | |
| 9,513,003 B2 * | 12/2016 | Watanabe | F23N 1/042 |
| 9,587,828 B2 * | 3/2017 | El Zahab | F23J 15/06 |
| 10,634,372 B2 | 4/2020 | Couperthwaite et al. | |
| 2001/0020451 A1 | 9/2001 | Besik | |
| 2001/0040322 A1 | 11/2001 | Ohtsuka et al. | |
| 2005/0126199 A1 | 6/2005 | Akkad | |
| 2006/0249099 A1 * | 11/2006 | Besik | F22B 1/18 122/18.1 |
| 2007/0000906 A1 | 8/2007 | Kaastra | |
| 2009/0255323 A1 | 10/2009 | Butt et al. | |
| 2010/0025311 A1 | 2/2010 | Jones et al. | |
| 2010/0300658 A1 * | 12/2010 | Moldovanu | F01K 13/02 165/104.31 |
| 2011/0140291 A1 | 6/2011 | Hoglund | |
| 2011/0232775 A1 | 9/2011 | Chale et al. | |
| 2012/0199330 A1 | 8/2012 | Maurer et al. | |
| 2012/0221198 A1 | 8/2012 | Kohavi et al. | |
| 2012/0247135 A1 | 10/2012 | Fakieh | |
| 2013/0186748 A1 | 7/2013 | Yoon et al. | |
| 2015/0090581 A1 * | 4/2015 | Saifutdinov | B01D 1/0064 202/160 |
| 2016/0083936 A1 | 3/2016 | Martin et al. | |
| 2017/0023276 A1 * | 1/2017 | Telian | F24H 1/28 |
| 2017/0122552 A1 * | 5/2017 | Zhang | F22D 11/02 |
| 2017/0334736 A1 | 11/2017 | Lam et al. | |
| 2017/0356663 A1 * | 12/2017 | Couperthwaite | F28F 13/06 |
| 2018/0301718 A1 * | 10/2018 | Kakuwa | H01M 8/0662 |
| 2019/0226699 A1 | 7/2019 | Lundgreen et al. | |
| 2019/0257533 A1 | 8/2019 | Tak | |

FOREIGN PATENT DOCUMENTS

| | | |
|---|---|---|
| CN | 103328031 A | 9/2013 |
| DE | 2512233 A1 | 9/1976 |
| DE | 3145302 A1 | 5/1983 |
| EP | 1260772 A1 | 11/2002 |
| EP | 1703220 A1 | 9/2006 |
| EP | 3242081 A1 | 11/2017 |
| EP | 3339729 A1 | 6/2018 |
| EP | 3258180 A2 | 1/2020 |
| GB | 628351 A | 8/1949 |
| JP | 59210215 A | 11/1984 |
| JP | 59210234 A | 11/1984 |
| JP | 2014085027 A | 5/2014 |
| JP | 5950788 A | 7/2016 |
| KR | 100607854 B1 | 8/2006 |
| KR | 100816042 B1 | 3/2008 |
| KR | 101243698 B1 | 3/2013 |
| KR | 1020170003813 B1 | 1/2017 |
| SU | 1760239 A1 | 9/1992 |
| WO | 8602140 A1 | 4/1986 |

OTHER PUBLICATIONS

International Search Report and Written Opinion corresponding to PCT/US2019/014258, dated May 9, 2019.
Nortec—2014 GS Install and Operations Manual, Jan. 2014.
Nortec—GS Install-Pulsed Dual Fill Valve, Nov. 2015.

(56) References Cited

OTHER PUBLICATIONS

Supplementary European Search Report for EP 19741306, dated Jan. 13, 2022.
"Classification of Heath Exchangers," published Jan. 5, 2012, accessed at <http://web/iitd.ac.in/pmvs/courses/mel709/classification-hx.pdf> (Year: 2012).

* cited by examiner

CONDENSING, ULTRA-LOW NOX GAS-FIRED HUMIDIFIER

RELATED APPLICATION

This application is a continuation of application Ser. No. 16/251,938, filed Jan. 18, 2019, now U.S. Pat. No. 11,421,899; which claims priority to provisional application Ser. No. 62/619,701, filed Jan. 19, 2018, which applications are incorporated herein by reference in their entirety.

BACKGROUND

Steam is often used to humidify buildings for comfort and process applications. If a building does not have a steam boiler, or has insufficient steam capacity, a steam generating humidifier can be used to supply steam for humidification purposes. Humidification steam generators typically use electricity or gas (natural gas or propane) to heat and boil water at atmospheric pressure.

Gas-fired humidifiers cost significantly less to operate than electric humidifiers but are more expensive to purchase and install. The typical thermal efficiency of flue category I and III gas fired humidifiers is about 80-84% assuming gross fuel heating values. The primary heat exchanger is immersed in a tank of 212 degrees Fahrenheit (F) boiling water, thus limiting exiting flue temperatures to something greater than 212 F, typically 350 F-400 F for flue category I and III appliances. The remaining 16-20% of the fuel's energy is contained in the flue gas and is often referred to as stack losses. Therefore, thermal efficiency is the efficiency of the heat exchangers in transferring flue gas energy to the process fluids being heated. Another way of measuring efficiency is fuel-to-steam, or net efficiency. In addition to stack losses, net efficiency accounts for energy losses to ambient and is thus influenced by tank sizes and insulation. Net efficiency is always less than thermal efficiency, and can vary significantly with not only tank sizes and insulation but additionally BTUH input rate, supply water, combustion air and ambient air temperatures. Gas-fired humidifiers, which are un-pressurized and operate at atmospheric pressure, are a recent arrival compared to other gas-fired appliances, as they were introduced in the mid 1990's. With sales at just a small fraction of other gas-fired appliances, such as furnaces, steam boilers, hydronic boilers and water heaters, gas-fired humidifiers are a unique niche product. Improvements in gas-fired humidifier technology are desired.

SUMMARY

The high exiting flue temperatures of typical gas fired humidifiers eliminates the option of low cost plastic flue venting, such as PVC. In the market, the typical 80-84% efficiency of gas-fired humidifiers is generally perceived as unacceptable to some customers since many other gas-fired appliances are condensing. Water vapor in flue gasses begins to condense at about 90% thermal efficiency with natural gas, or at about 135F flue gas temperature, which can usually allow PVC flue venting as the flue gas temperature is significantly less than 149F. Additionally, some areas require gas-burning appliances to have ultra-low NOx emissions (i.e., NOx ppm corrected to 3% O2 in the flue gas) (<20 ppm). Generally, NOx refers to nitrogen oxides associated with air pollution, for example nitric oxide (NO) and nitrogen dioxide (NO2). However, reducing NOx emissions reduces efficiency by about 2% which can take a condensing, 90% efficient appliance down to a non-condensing 88% efficiency and increase flue temperatures. However, this disclosure shows and describes a gas fired humidifier that provides condensing, high efficiency operation (>90%, flue gas category IV) while simultaneously achieving ultra-low NOx of <20 ppm and being suitable for PVC flue venting by keeping flue temperatures below 149F. The improved efficiency should not compromise reliability or require additional maintenance.

In one example, a gas-fired humidifier is disclosed with improved efficiency and reduced emissions. The humidifier can include an atmospheric pressure storage tank for holding a volume of water, the storage tank having a make-up water inlet and a steam outlet, a gas-fired burner and combustion blower assembly, and a primary heat exchanger connected to the gas-fired burner and combustion blower assembly, the primary heat exchanger being located within the atmospheric pressure storage tank and configured to heat the volume of water to generate steam. In one aspect, the gas-fired humidifier can have a thermal efficiency of greater than 90 percent and a NOx(3) output of less than 20 parts per million (ppm). The humidifier can also include a secondary heat exchanger having a first heat exchange section for heating a first fluid stream and a separate second heat exchange section for heating a second fluid stream, the first and second heat exchange sections being in heat transfer communication with exhaust gases generated by the gas-fired burner and combustion blower assembly.

In some examples, the first fluid stream is a combustion air stream in fluid communication with the combustion air blower inlet of the gas-fired burner and combustion blower assembly.

In some examples, the second fluid stream is an inlet water stream in fluid communication with the make-up water inlet of the storage tank.

In some examples, the first heat exchange section is upstream of the second heat exchange section with respect to the exhaust gases generated by the gas-fired burner and combustion blower assembly.

In some examples, the first and second heat exchanger sections are shell and tube heat exchangers.

In some examples, the shell and tube heat exchanger includes a plurality of tubes in fluid communication with the exhaust gases.

In some examples, at least one of the tubes or a bottom tubesheet includes at least one orifice opening into the first heat exchange section of the secondary heat exchanger.

In some examples, the first heat exchange section and the second heat exchange sections are provided within a common outer shell and are separated from each other by a divider plate.

A gas-fired humidifier can include an atmospheric pressure storage tank for holding a volume of water, the storage tank having a make-up water inlet and a steam outlet, a gas-fired burner and combustion blower assembly, a primary heat exchanger connected to the gas-fired burner and combustion blower assembly, the primary heat exchanger being located within the storage tank and configured to heat the volume of water to generate steam, wherein the gas-fired humidifier exchanges heat between flue gases, generated by the gas fired burner and combustion blower assembly, and at least one of intake air fed to the gas fired burner and combustion blower assembly and water delivered to the make-up water inlet to achieve a thermal efficiency of greater than 90 percent and a NOx(3) output of less than 20 parts per million (ppm).

In some examples, the humidifier further includes a secondary heat exchanger having a first heat exchange section for heating a first fluid stream and a separate second heat exchange section for heating a second fluid stream, the first and second heat exchange sections being in heat transfer communication with exhaust gases generated by the gas-fired burner and combustion blower assembly.

In some examples, the first fluid stream is a combustion air stream in fluid communication with an inlet of the gas-fired burner and combustion blower assembly.

In some examples, the second fluid stream is an inlet water stream in fluid communication with the make-up water inlet of the storage tank.

In some examples, the first heat exchange section is upstream of the second heat exchange section with respect to the exhaust gases generated by the gas-fired burner and combustion blower assembly.

In some examples, the secondary heat exchanger is a shell and tube heat exchanger.

In some examples, the shell and tube heat exchanger includes a plurality of tubes in fluid communication with the exhaust gases.

In some examples, the first heat exchange section is separated from the second heat exchanger section by a divider plate and wherein the plurality of tubes extends through the divider plate.

In some examples, at least one of the tubes includes at least one orifice opening into the first heat exchange section of the secondary heat exchanger.

A heat exchanger for a gas-fired humidifier is also disclosed. The heat exchanger can include an outer shell and a plurality of tubes extending within the outer shell, the tubes defining a combustion air inlet at one end of the tubes and a combustion air outlet at an opposite end of the tubes. The heat exchanger can include a divider plate dividing the heat exchanger into a first heat exchange section and a second heat exchange section. The heat exchanger can include a combustion air inlet and a combustion air outlet extending through the outer shell at the location of the first heat exchange section. The heat exchanger can include a make-up water inlet and a make-up water outlet extending through the outer shell at the location of the second heat exchange section.

In some examples, at least one of the tubes includes at least one orifice opening into the first heat exchange section of the heat exchanger.

In some examples, the plurality of tubes includes between 15 and 40 tubes.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is below.

DETAILED DESCRIPTION

Figure 1:
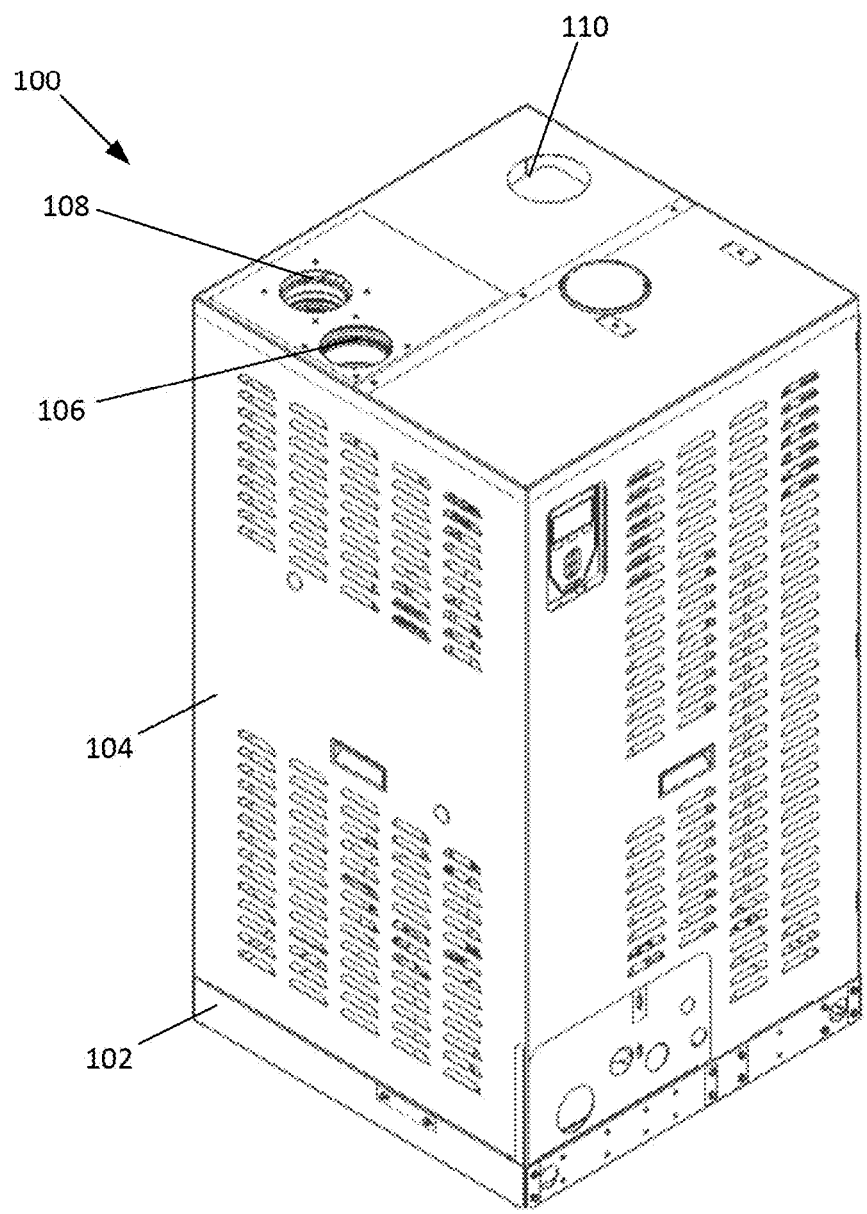
FIG. 1 is a perspective view of an exemplary gas-fired humidifier having features in accordance with the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Figure 2:
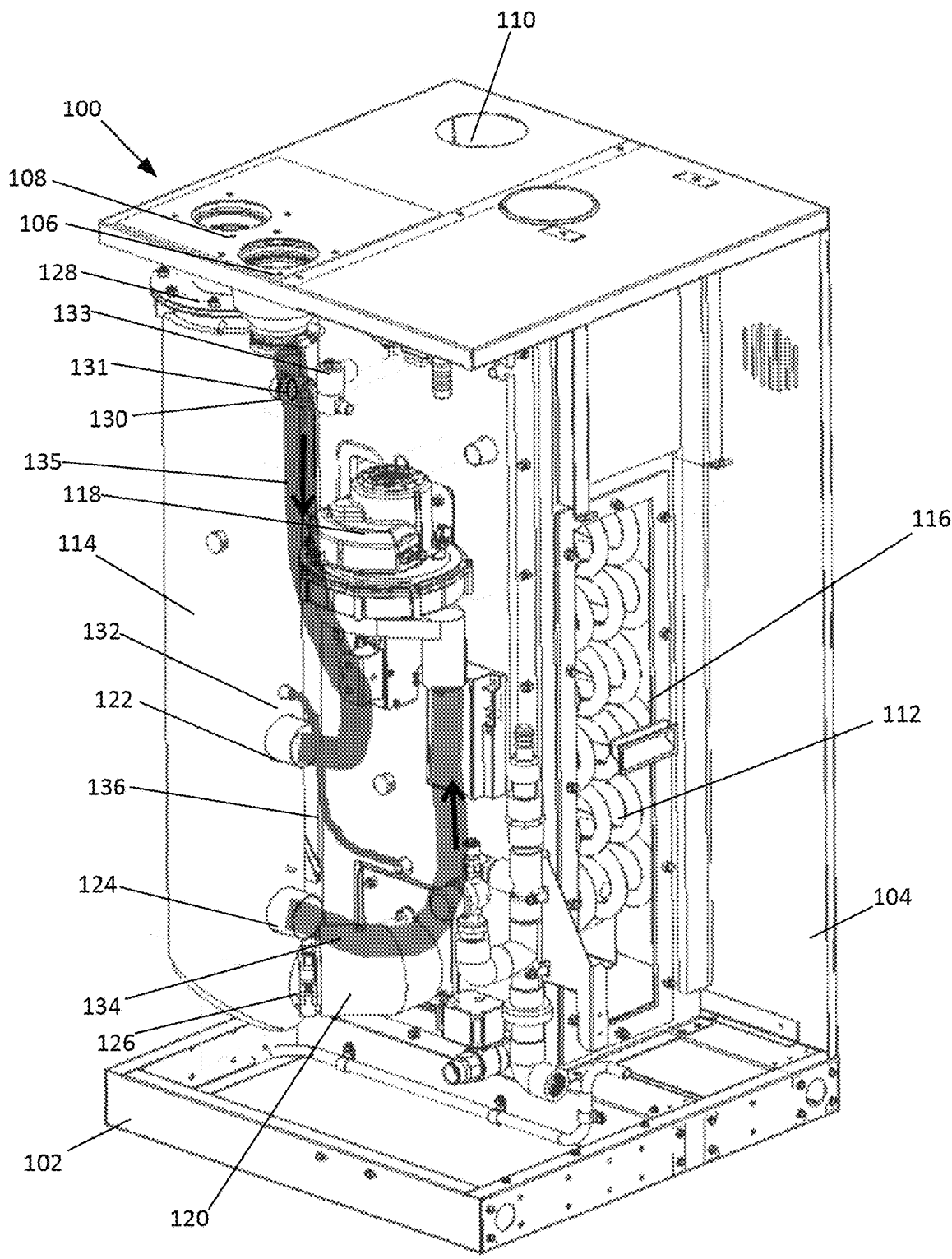
FIG. 2 is a perspective view of the gas-fired humidifier shown in FIG. 1, with an outer housing portion removed such that internal portions of the gas-fired humidifier can be viewed.
Figure 3:
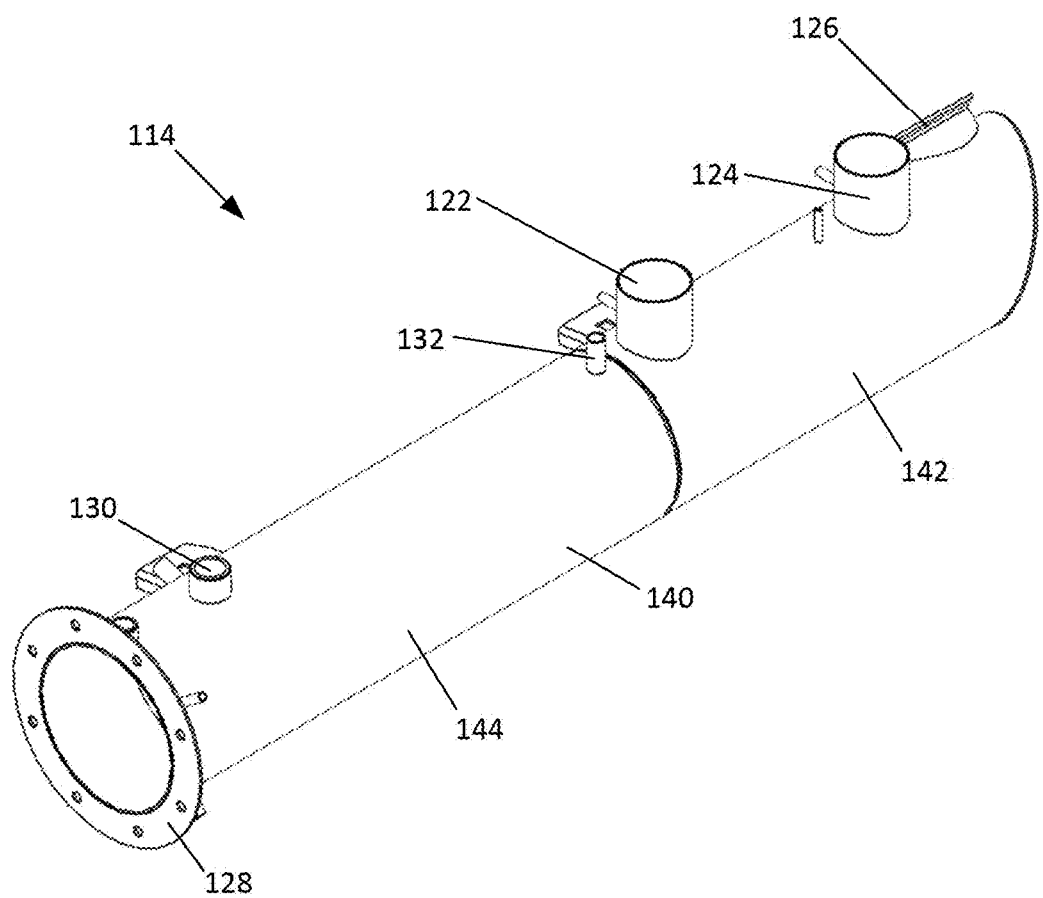
FIG. 3 is a perspective view of a heat exchanger assembly of the gas-fired humidifier shown in FIG. 1.
Figure 4:
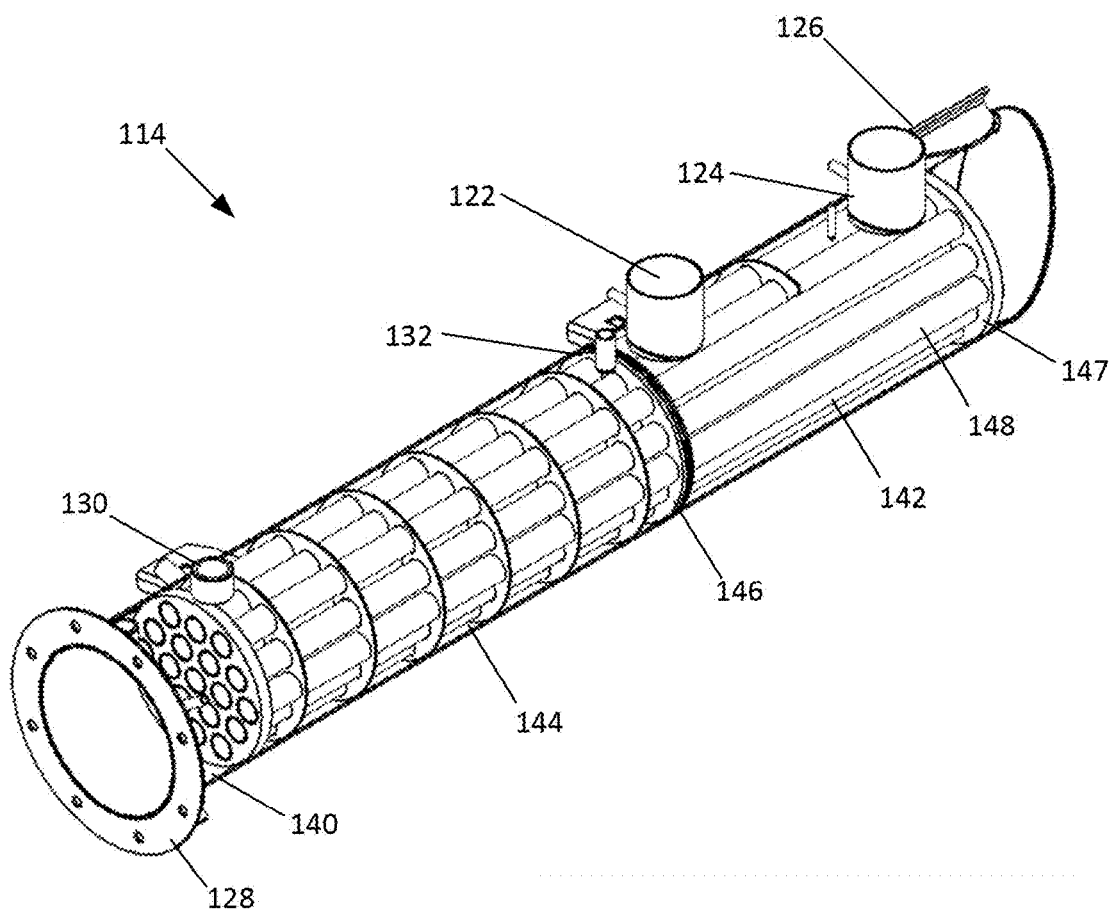
FIG. 4 is a perspective view of the heat exchanger assembly shown in FIG. 3, with an outer casing of the heat exchanger assembly being shown as transparent such that internal portions of the heat exchanger assembly can be viewed.
Figure 5:
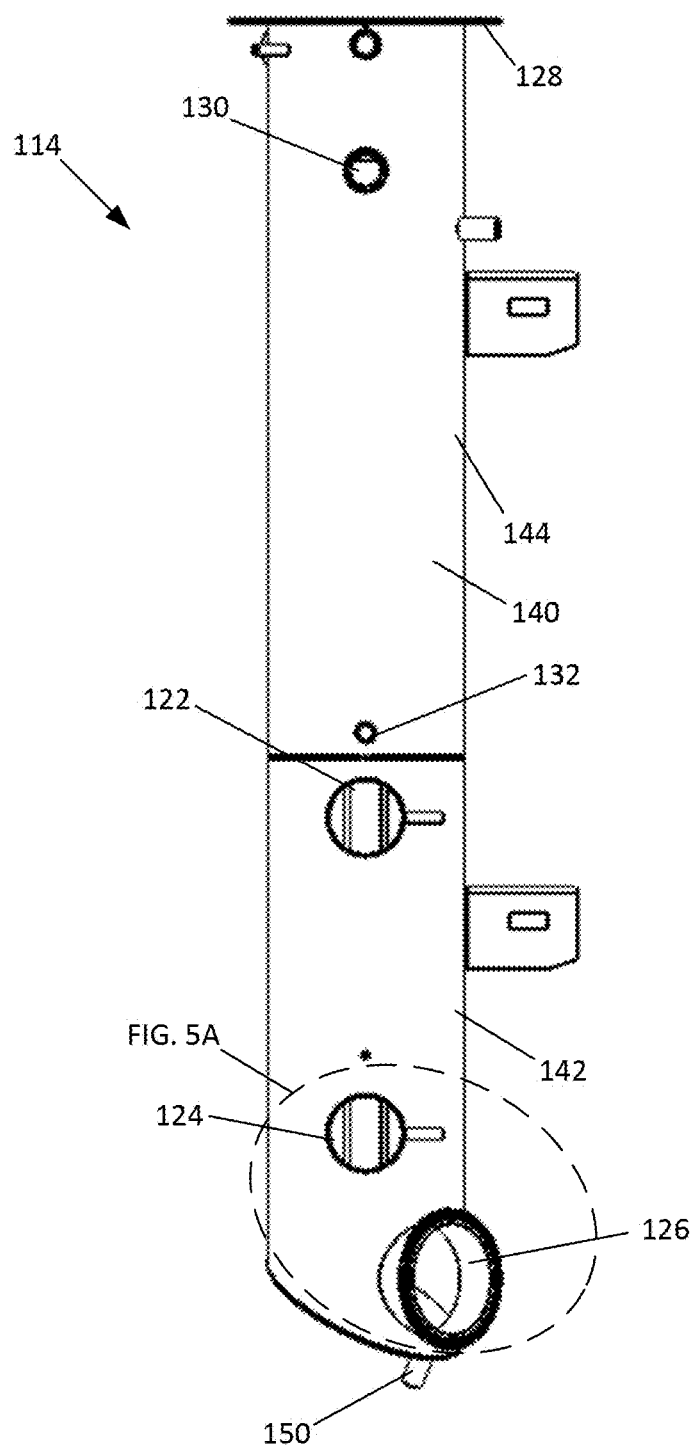
FIG. 5 is a side view of the heat exchanger shown in FIG. 3.
Figure 5A:
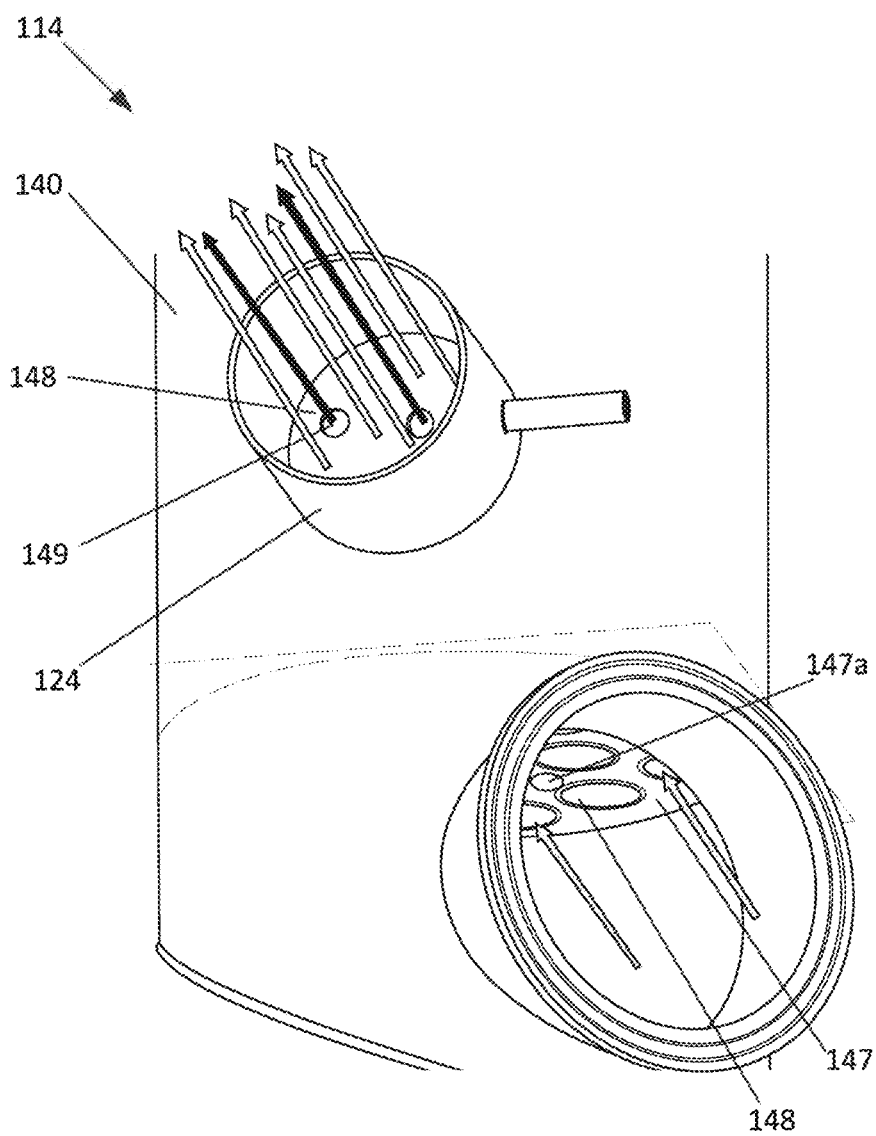
FIG. 5A is an enlarged view of a portion of the heat exchanger shown in FIG. 3, as indicated at FIG. 5.

Referring to FIGS. 1 and 2, a gas-fired humidifier 100 is shown. As presented, the gas-fired humidifier 100 includes a chassis or base 102 and an outer housing or casing 104. The gas-fired humidifier 100 is provided with a combustion air inlet 106, a flue gas outlet 108, and a steam outlet 110. The combustion air inlet and outlet 106, 108 can be connected to the outdoors via ducting or piping, for example PVC piping. The steam outlet 110 can be connected to end use devices, such as steam dispersion elements for the purpose of humidification. Although not shown, the gas-fired humidifier 100 is also provided with a make-up water inlet and a natural gas inlet.

As most easily seen at FIG. 2, the gas-fired humidifier 100 is further shown as including a primary heat exchanger 112 and a secondary heat exchanger 114. The primary heat exchanger 112 is located within a tank or container 116 and converts water stored within the tank to steam, which subsequently exits steam outlet 110. The primary heat exchanger 112, which is shown as being a manifolded tube-type heat exchanger, is connected at an inlet end 112a to a gas-fired burner and combustion blower assembly/blower 118. The primary heat exchanger 112 is connected to the secondary heat exchanger 114 at an outlet end 112b via a conduit 120.

With continued reference to FIG. 2, it can be seen that the secondary heat exchanger 114 includes a combustion air inlet 122, a combustion air outlet 124, an exhaust air inlet 126, an exhaust air outlet 128, a supply water inlet 130, and a supply water outlet 132. The combustion air inlet 122 of the secondary heat exchanger 114 extends to the combustion air inlet 106 via conduit 135 while the combustion air outlet 124 is connected to an inlet of the gas-fired burner and combustion blower assembly/blower 118 via a conduit 134. The exhaust air inlet 128 is connected to the conduit 120 while the exhaust air outlet 128 of the secondary heat exchanger 114 extends to the flue gas outlet 108. The supply water inlet 130 of the secondary heat exchanger 114 extends to the supply water inlet (not shown) while the supply water outlet 132 is connected to the tank 116 via a conduit 136.

In one aspect, a pressure compensating orifice 131 can be used in the supply water line going to the secondary heat exchanger 114 water inlet 130. The orifice 131 provides a generally constant flow rate at varying pressures. The orifice flow rate is sized according to the steam output and a solenoid valve 133 is pulse-width-modulated to control the supply water entering the secondary heat exchanger 114 such that steam output and water supply flow rates remain equal. This also ensures steady flue gas outlet temperatures, steam output and efficiency. The orifice 131 can be located directly at the water inlet 130 to the secondary heat exchanger 114 to exploit the kinetic energy of the high velocity water stream produced by the pressure drop across the orifice 131. The high velocity water stream impinges the heat exchanger tubes 148 just prior to them exiting the heat exchanger to enhance heat transfer in this counter-flow design.

The details of the secondary heat exchanger 114 are shown in further detail at FIGS. 3 to 5A. As most easily viewed at FIG. 4, the secondary heat exchanger 114 includes an outer housing, shell or casing 140 and is divided internally into a first section 142 and a second section 144 by a divider plate 146. The outer housing or casing 140 is shown as being transparent at FIG. 4 such that the divider plate 146 and other internal components can be more easily viewed. As shown, the secondary heat exchanger 114 is provided with a plurality of heat exchanger tubes 148 that extend through both sections 142, 144 and are arranged such that flue exhaust gases entering the exhaust air inlet 126 pass through the tubes and are delivered to the exhaust gas outlet 128. In the example shown, 19 tubes having a nominal internal diameter of ⅝ inch and a length of about 27 inches are shown. However, the number and size of tubes 148 can be selected to meet any particular application. For example, between 15 and 40 tubes 148 can be provided at a diameter between ½ inch and ¾ inch and a length between 25 and 35 inches.

In one aspect, the secondary heat exchanger 114 shown at FIGS. 2 to 6 can be characterized as a shell and tube heat exchanger. However, the disclosure is not limited to this specific type of heat exchanger, even though it is a preferred embodiment. For example, FIG. 7 shows a tube-type heat exchanger 214 having an outer shell 240 and an inner shell 241. Flue gases can pass through the inner shell 241 and the combustion air or water can pass from an inlet 222, 230 to an outlet 224, 232 whereby the fluid is routed through the interstitial space between the inner and outer casings 240, 241. Other types of heat exchangers may be used as well, such as plate-type heat exchangers, plate and shell heat exchangers, coiled tube heat exchangers, and water-to-air heat exchangers such as hydronic coils.

In one aspect, the combustion air inlet 122 and combustion air outlet 124 of the heat exchanger 114 shown in FIGS. 2 to 6 are both open to the first section 142 while the supply water inlet 130 and the supply water outlet 132 are both open the second section 144. The divider plate 146 ensures that the supply water and combustion air remain separate from each other.

Figure 6:
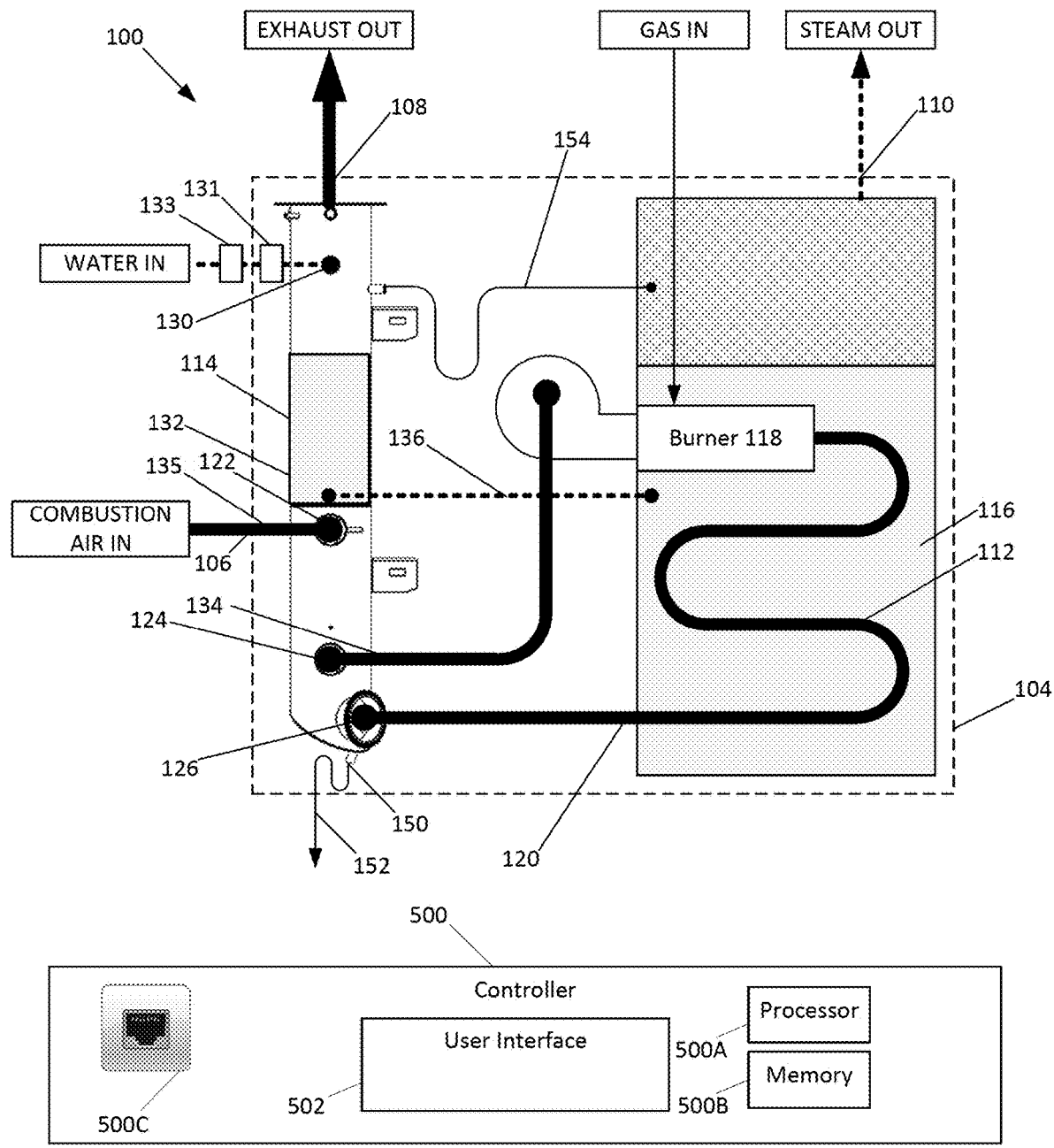
FIG. 6 is a schematic representation of the gas-fired humidifier shown at FIG. 1.
Figure 7:
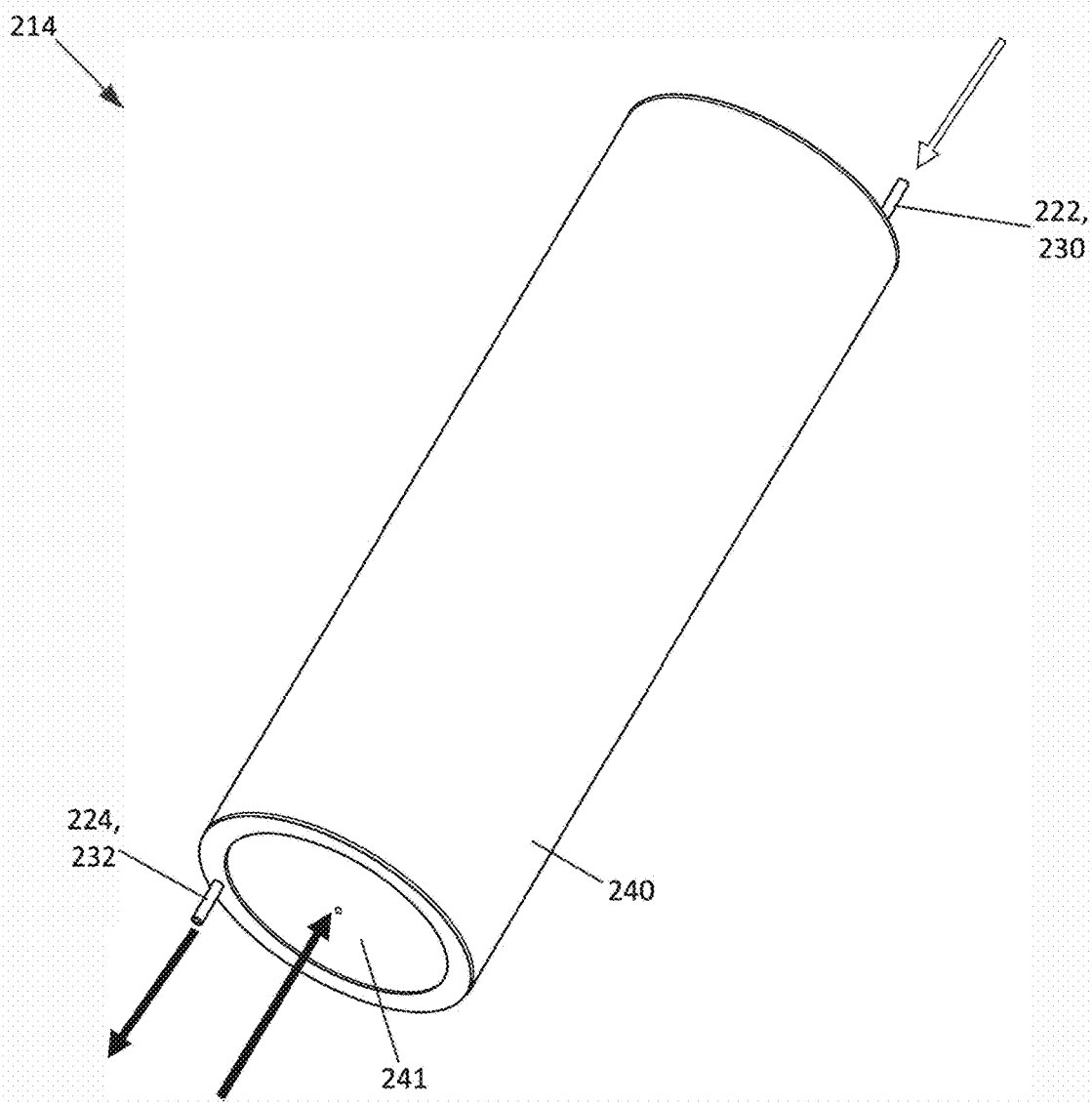
FIG. 7 is a schematic perspective view of an alternative heat exchanger section that can be used as the first or second heat exchange section in the humidifier shown in FIG. 1.

Referring to FIG. 6, additional aspects of the gas-fired humidification system 100 are shown. For example, a pressure equalization line 154 can be provided between the water in the second section 144 (discussed later) and the steam section in the tank 116. As shown, the water inlet location is above the overflow port of the tank 116. This configuration allows for the prevention of water backflow in the event of a vacuum applied to the inlet water system. The pressure equalization line 154 between the secondary water section 144 and tank 116 maintains the same water levels between the secondary water section 144 and tank 116 and allows air to enter the secondary water section 144. The pressure equalization line 154 incorporates a p-trap to block steam from tank from entering into secondary water section. Also shown is a condensate outlet 150 in the secondary heat exchanger 114 and a connected conduit 152 for allowing condensate to be removed from the first section 142.

The operation of the gas-fired humidification system 100 can be most easily seen at FIG. 6. As previously described, the burner and combustion blower assembly/blower 118 provides heat to the primary heat exchanger 112 by combusting natural gas and air and delivering the exhaust gases to the primary heat exchanger 112. The primary heat exchanger 112 is immersed in water within the tank 116 and heats the water up to the boiling temperature of the water (e.g. 212 Fahrenheit). The generated steam exits the tank 116 at the outlet 110 which causes the water level in the tank to drop. In response, supply water is added to the tank 116 to keep the water at a desired level. The supply water can be provided with a valve and the tank 116 can be provided with a level sensor such that the desired amount of water is added when necessary.

From the primary heat exchanger 112, the exhaust gases (at about 240 degrees F.) are delivered to the secondary heat exchanger 114. In the first section 142 of the secondary heat exchanger 114, combustion air from the outdoors is received at the inlet 122 where the exhaust gases travelling through the tubes 148 operate to heat the combustion air before the combustion air exits the secondary heat exchanger 114 via outlet 124. Simultaneously, the combustion air travelling through the first section 142 cools the exhaust gases travelling through the tubes 148. From outlet 124 of the secondary heat exchanger 114, the pre-heated combustion air is delivered to the burner and combustion blower assembly via the conduit 134. In one aspect, the first section 142 is connected to the burner and combustion blower assembly/blower 118 and primary heat exchanger 112 such that a counterflow arrangement is provided, wherein the exhaust gases travel through the first section 142 in an opposite direction that the combustion air flows through the first section 142. This increases the efficiency of the secondary heat exchanger first section 142.

With continued reference to FIG. 6, it can be seen that supply water enters the second section 144 at the inlet 130 and exits at the outlet 132. The second section 144 is located downstream of the first section 142 such that the exhaust air travelling through the tubes 148 enters the second section 144 at a lower temperature relative to the entering temperature at inlet 126. Even though at a reduced temperature, energy remains in the exhaust gases to heat the supply water within the second section 144 such that pre-heated water can be delivered to the tank 116 at an elevated temperature, thus providing an energy savings. Simultaneously, the temperature of the exhaust gases is sufficiently reduced by the supply water to allow the exhaust gases to be delivered to the outdoors via PVC piping. In one aspect, the supply water reduces the temperature of the exhaust gases sufficiently (e.g. 125-149 degrees F., or less) such that condensation of the exhaust gases occurs, which results in further efficiency gains.

By placing the first section 142, which pre-heats the combustion air, upstream of the second section 144, which pre-heats the supply water, relative to the flow of the exhaust gases through the tubes 148, certain advantages are achieved. For example, because the heat transfer coefficient for transferring heat into the air is much lower than for water heat transfer performance is improved. By utilizing the maximum delta T (Temperature difference between the flue gas and combustion air) from positioning the air heat exchanger upstream of the water heat exchanger the heat transfer is enhanced. Another advantage is that reduced air-flow pressure drop across the heat exchanger is achieved because heating the combustion air first allows a less restrictive combustion air flow design within the heat exchanger while still achieving acceptable heat transfer. Yet another advantage is that maintenance is reduced from minimized water scaling within supply water heat exchanger. The flue gas temperature is reduced by passing through the combustion air heat exchanger before entering the supply water heat exchanger. The excellent heat transfer coefficient of water enables acceptable heat transfer with the reduced delta T (temperature difference between the flue gas and water). This reduces the maximum exiting temperature of the supply water from the heat exchanger, which minimizes the precipitation of minerals, or temporary hardness, from hard water. By minimizing mineral precipitation the supply water heat exchanger remains clean and efficient for reduced maintenance. Additionally, the shell-and-tube design of the heat exchanger 114 provides more water wetted area in a smaller package than a tube coil design, where the water is in the tube ID and flue gas is on the tube OD. Increased water wetted area increases the time between maintenance intervals. Although the preferred design, with its numerous benefits described above, locates the air section upstream of the water section, testing has shown that with the sections inverted (water section upstream of air section) efficiency is only slightly reduced. Accordingly, such a configuration is also possible without departing from the concepts presented herein.

In the example presented, some of the plurality of tubes (e.g. three tubes) are provided with openings or orifices 149 in the first section 142 such that some of the exhaust gases travelling through the tubes are pulled into the combustion air flow stream. Additionally, an orifice 147*a* in the bottom tubesheet 147 also admits flue gas into the air section while also functioning as a water drain. Since these units will often draw combustion air from outside the building (sealed combustion) there are scenarios where it is possible to accumulate water in the bottom of the air section, such as from condensation while the unit is off or from drawing in moisture, such as snow, with the combustion air. In the event that moisture does accumulate in the air section, the orifice 147*a* in the bottom tubesheet 147 functions to drain the water into the bottom of the heat exchanger 114 where it exits through the flue gas condensate outlet 150 and condensate line 152. This configuration allows for flue gas recirculation (FGR) for improved efficiency while maintaining ultra-low NOx. NOx is formed when combustion temperatures exceed a certain threshold, thus forcing some of the usually inert nitrogen to combine with oxygen to form NO and NO2, or NOx, which contributes to smog and acid rain. A typical way to reduce NOx without using FGR, which can be used in conventional gas-fired humidifiers, is to increase excess air levels from 10%-20% (2-3% O2) in the flue gas to 30%-45% (5-7% O2). The additional excess air absorbs energy during the combustion process and reduces combustion temperatures. Although NOx is reduced, efficiency is also reduced. The additional excess air dilutes the flue gas, thus reducing the dew-point temperature and minimizing or eliminating condensation of flue gas water vapor, where 10% of the flue gas energy resides when burning natural gas. The additional excess air also contains heat energy which exits with the flue gas. FGR reduces NOx with negligible impact on efficiency. Instead of increasing excess air levels to 30%-45% and incurring an efficiency penalty, approximately 5-25% of the flue gas is mixed with the combustion air while maintaining excess air at an efficient 10%-20%. This reduces the amount of oxygen in the combustion air, a necessary component of NOx, and also mixes CO2 gas and H2O vapor from the flue gas into the combustion air. CO2 gas and H2O water vapor have higher specific heat capacities then O2 and N2, thus absorbing energy and reducing combustion temperatures more effectively than excess air. The disclosed FGR approach therefore allows efficient operation at 10-20% excess air while achieving ultra-low NOx. Even without FGR, the disclosed heat exchanger design provides sufficient performance when using 30-45% excess air to simultaneously achieve both condensing efficiency, >90% and ultra-low NOx(3), <20 ppm. The addition of FGR further increases the efficiency while maintaining ultra-low NOx.

In view of the foregoing description of the secondary heat exchanger 114 and its operation, several unique features and advantages of the design are realized. For example, even though heat exchange is occurring with different mediums (e.g. air and water) and with three different flow streams (e.g. combustion air, supply water, flue gasses), the same heat exchanger design configuration is provided in a single package or unit. Even though the volumetric flow rate of the combustion air is 1,000 times greater than the volumetric flow rate of the supply water, the shell-and-tube heat exchanger design accommodates the dramatic volumetric flow rates differences of combustion air and supply water in a single design. Such a configuration also reduces cost, space and flue gas connections compared to attaching two separate heat exchangers together. The counter-flow designs of both the air and water sections 142, 144 (air/water and flue gas moving in opposing directions) also enhances heat transfer. Due to the flexibility of this configuration, a single heat exchanger 114 design also works on multiple models with up to 300% difference in BTUH input rates (e.g. by changing turbulators inside the tubes to match the flue gas flow rates, backpressure and heat transfer can be balanced).

The disclosed secondary heat exchanger 114, and related design, also enables quieter operation. A significant source of noise is from air induction into the combustion blower. In the disclosed design, combustion air is first routed through the secondary heat exchanger 114. Thus, the secondary heat exchanger acts as an effective muffler to reduce air induction noise.

The disclosed secondary heat exchanger 114, and related design, also minimizes thermal acoustic issues. A problematic phenomenon with many gas-fired appliances is thermal acoustic issues or combustion driven oscillations. This is often manifest as a howling noise with unstable combustion and poor starting and/or operating performance. However, routing the combustion air through the secondary heat exchanger 114 allows the secondary heat exchanger to perform as a damper in the system to minimize thermal acoustic issues.

The disclosed secondary heat exchanger 114, and related design, also enables more consistent performance with varying combustion air temperatures. Combustion air temperatures can vary dramatically when using outside air. The combustion blower and gas valve assembly meter fuel proportionately with volumetric air flow. Since air density changes with temperature, the air-fuel ratio or percent of excess air in the flue gas changes with air temperature. For example, 0 degree F. air is 22% more dense than 100 degree F. air. A properly tuned, ultra-low NOx appliance running on 0 degree F. air may have excessive NOx and even CO using 100 degree F. air, since there is 22% less mass of air with about the same fuel. However, with the disclosed secondary heat exchanger 114 pre-heating combustion air, cold air is heated much more than warm air, thus stabilizing the air temperature entering the combustion blower. Testing has shown that the air temperature entering the combustion blower varies about ⅓ of the total air temperature change entering the heat exchanger. For example, testing has shown that 93 degrees F. air entering the heat exchanger exited the heat exchanger at 126 degrees F., an increase of 33F. With 43 degrees F. air entering the exiting temperature was 108 degrees F., a 65 degrees F. increase. Therefore, even though the temperature varied 50 degrees F. entering the heat exchanger (93 degrees F.-43 degrees F.) the temperature entering the combustion blower only varied 18 degrees F. (126 degrees F.-108 degrees F.). This arrangement of the disclosure provides more stabilized air-fuel ratios and hence more consistent performance and emissions.

In applying the concepts disclosed herein, prototypes of various sizes from 62 M BTUH to 186 M BTUH have been built and perform with flue temperatures in the 115-135 F range, NOX<20 ppm and efficiency>90% at full-fire. Additional models up to about 800 M BTUH can also utilize the same design concepts.

As combustion air and supply water temperatures decrease the net efficiency decreases because an increased percentage of the fuel's energy goes to heating combustion air and supply water instead of boiling water. When utilizing this secondary heat exchanger design, the thermal efficiency increases as combustion air and supply water temperatures entering the secondary heat exchanger decrease, (increased delta T) thus mostly offsetting the reduction in net efficiency. This stabilizes the net efficiency such that steam output only decreases about 1.3% going from 70 F. combustion air and water to 40 F. However, with a standard efficiency gas fired humidifier there is no additional thermal efficiency with cooler combustion air and supply water. Given the example above, a standard efficiency unit will have a steam output reduction of about 3.4%

The above-described operation of the humidifier can be implemented through the use of an electronic controller 500, as schematically illustrated at FIG. 6. The electronic controller 500 is schematically shown as including a processor 500A and a non-transient storage medium or memory 500B, such as RAM, flash drive or a hard drive. Memory 500B is for storing executable code, the operating parameters, and the input from the operator user interface 502 while processor 500A is for executing the code. The electronic controller is also shown as including a transmitting/receiving port 500C, such as an Ethernet port for two-way communication with a WAN/LAN related to an automation system. A user interface 502 may be provided to activate and deactivate the system, allow a user to manipulate certain settings or inputs to the controller 500, and to view information about the system operation.

The electronic controller 500 typically includes at least some form of memory 500B. Examples of memory 500B include computer readable media. Computer readable media includes any available media that can be accessed by the processor 500A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The electronic controller 500 is also shown as having a number of inputs/outputs that may be used for implementing the above-described operation of the humidifier 100. For example, the controller 500 can provide outputs for energizing the burner blower, water fill valve, gas valve assembly, and any other components (e.g. drain valve, damper actuators, etc.) used in the operation of the humidifier 100. Status inputs can be provided for each of the aforementioned control components as well. Additionally, the controller 500 can provide inputs for various sensors to enable operation and monitoring of the system. For examples, the controller 500 inputs can be provided for receiving signals from various sensors that measure tank water temperature, tank water level, combustion air temperature, flue gas temperature, water inlet and other temperatures, intermediate temperatures and pressures, steam pressure, flue gas temperature, and flue gas conditions (e.g. $O_2$ and/or $CO_e$ sensors). The controller 500 can also include additional inputs and outputs for desirable operation of the humidifier 100 and related systems.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed is:
1. A gas-fired humidifier comprising:
 a) an atmospheric pressure storage tank for holding a volume of water, the storage tank having a make-up water inlet and a steam outlet;
 b) a gas-fired burner and combustion blower assembly;
 c) a primary heat exchanger connected to the gas-fired burner and combustion blower assembly, the primary heat exchanger being located within the storage tank and configured to heat the volume of water to generate steam;

d) a make-up water heat exchanger configured to receive exhaust gases generated and discharged by the gas-fired burner and combustion blower assembly to pre-heat make-up water delivered to the storage tank, the make-up water heat exchanger having a combustion gas side through which exhaust gases flow in an upward direction, and a water side in which the make-up water flows in a downward direction;

e) a first conduit connecting a first port of the make-up water heat exchanger to the storage tank make-up water inlet;

f) a second conduit connecting an exhaust gas inlet port of the make-up water heat exchanger to an outlet of the primary heat exchanger;

g) a pressure equalization line connecting a second port of the make-up water heat exchanger to the storage tank at a location above the make-up water inlet, the second conduit including a trap section to block steam from the storage tank from entering the make-up water heat exchanger;

h) a make-up water valve assembly including a solenoid valve and an orifice for controlling a net flow rate of an inlet water stream into the make-up water heat exchanger, the make-up water valve assembly being directly connected to a third port of the make-up water heat exchanger; and i) an electronic controller configured to send a pulse-width-modulated output signal to the solenoid valve to supply make-up water to the make-up water heat exchanger.

2. The gas-fired humidifier of claim 1, wherein the orifice is located downstream of the solenoid valve.

3. The gas-fired humidifier of claim 1, wherein the make-up water heat exchanger is a shell and tube heat exchanger.

4. The gas-fired humidifier of claim 3, wherein the shell and tube heat exchanger includes a plurality of tubes in fluid communication with the exhaust gases.

5. The gas-fired humidifier of claim 4, wherein the plurality of tubes includes between fifteen and forty tubes.

6. A gas-fired humidifier comprising:

a) an atmospheric pressure storage tank for holding a volume of water, the storage tank having a make-up water inlet and a steam outlet;

b) a gas-fired burner and combustion blower assembly;

c) a primary heat exchanger connected to the gas-fired burner and combustion blower assembly, the primary heat exchanger being located within the storage tank and configured to heat the volume of water to generate steam;

d) a make-up water heat exchanger configured to receive exhaust gases generated and discharged by the gas-fired burner and combustion blower assembly to pre-heat make-up water delivered to the storage tank, the make-up water heat exchanger having a combustion gas side through which exhaust gases flow in an upward direction, and a water side in which the make-up water flows in a downward direction;

e) a first conduit connecting a first port of the make-up water heat exchanger to the storage tank make-up water inlet;

f) a second conduit connecting an exhaust gas inlet port of the make-up water heat exchanger to an outlet of the primary heat exchanger;

g) a make-up water valve assembly, including a solenoid valve and a pressure compensating orifice downstream of the solenoid valve, for controlling a net flow rate of an inlet water stream into the make-up water heat exchanger, the make-up water valve assembly being directly connected to the make-up water heat exchanger by a third conduit; and h) an electronic controller configured to send a pulse-width-modulated output signal to the make-up water valve assembly to supply make-up water to the make-up water heat exchanger;

i) a pressure equalization line connecting a second port of the make-up water heat exchanger to the storage tank at a location above the make-up water inlet, the second conduit including a trap section to block steam from the storage tank from entering the make-up water heat exchanger.

7. The gas-fired humidifier of claim 6, wherein the make-up water heat exchanger is a shell and tube heat exchanger, wherein the shell and tube heat exchanger includes a plurality of tubes in fluid communication with the exhaust gases, and wherein the plurality of tubes includes between fifteen and forty tubes.

\* \* \* \* \*